United States Patent
Milton, Jr.

[15] 3,667,548
[45] June 6, 1972

[54] METHOD OF WELL STIMULATION

[72] Inventor: Harry W. Milton, Jr., Findlay, Ohio

[73] Assignee: Marathon Oil Company, Findlay, Ohio

[22] Filed: Dec. 7, 1970

[21] Appl. No.: 95,965

[52] U.S. Cl. ......................................................166/305 R
[51] Int. Cl..........................................................E21b 43/25
[58] Field of Search..............................166/305 R, 311, 312

[56] References Cited

UNITED STATES PATENTS

| | | | |
|---|---|---|---|
| 2,331,594 | 10/1943 | Blair | 166/305 R |
| 3,537,524 | 11/1970 | McMillen | 166/305 R |
| 3,467,194 | 9/1969 | Kinney | 166/305 R |
| 3,470,958 | 10/1969 | Kinney | 166/305 R |

*Primary Examiner*—Robert L. Wolfe
*Attorney*—Joseph C. Herring, Richard C. Willson, Jr. and Jack L. Hummel

[57] ABSTRACT

Crude oil production from a producing means in fluid communication with an oil-bearing subterranean reservoir is improved by injecting into the formation about 0.1 – 10 barrels of a micellar dispersion per vertical foot of oil-bearing sand and then injecting a sufficient volume of hydrocarbon solution containing an oil-wetting agent, e.g. high molecular amines, substituted-ammonium compounds, etc., into the formation to displace the micellar dispersion radially out into the reservoir and to wet the reservoir rock with the hydrocarbon solution to a distance of about 3 – 20 feet, and thereafter returning the well to production. Such a process, inter alia, improves the relative permeability to the flow of crude oil and establishes an oleophilic character in the reservoir immediately adjacent to the wellbore, the overall effect being to improve the productivity index.

15 Claims, No Drawings

METHOD OF WELL STIMULATION

BACKGROUND OF THE INVENTION

1. Field of the Invention

The present invention relates to increasing the production of a producing well by chemical stimulation. The invention has use in recovery of petroleum from underground formations.

2. Description of the Prior Art

U.S. Pat. Nos. 3,467,194 and 3,470,958 teach increasing the productivity of a producing well by injecting into the formation water-external or oil-external micellar dispersions. These processes provide for the temporary improvement of the relative permeability to the flow of crude oil in the area immediately adjacent to the wellbore, but do not leave a lasting oleophilic character in the reservoir.

U.S. Pat. No. 2,331,594 increases the "oil cut" from a producing well by injecting an oil-wetting agent into the wellbore. Although this process imparts an oleophilic character in the surrounding formation, the surface area which the oil-wetting agent encounters is limited.

SUMMARY OF THE INVENTION

Applicant has discovered that a lasting oleophilic character can be imparted to an oil-bearing subterranean formation by first injecting into the formation an oil-external micellar dispersion and then injecting hydrocarbon, e.g., crude oil, containing an oil-wetting agent(s). The micellar dispersion removes the skin damage from the face of the wellbore and cleanses the pores of the strata in the formation. The following hydrocarbon solution containing oil-wetting agent(s) is then able to penetrate into the formation and allow the oil-wetting chemical to coat a much larger surface area than could be expected without initially cleansing the formation.

DESCRIPTION OF THE PREFERRED EMBODIMENTS

The micellar dispersion is composed essentially of hydrocarbon, an aqueous medium, a surfactant sufficient to impart micellar characteristics to the dispersion, and optionally cosurfactant(s) and/or electrolyte(s). Examples of volume amounts include about 1 to about 80 percent hydrocarbon, about 10 to about 95 percent aqueous medium, at least about 4 percent surfactant, about 0.01 to about 20 percent cosurfactant and about 0.001 to about four percent by weight of the electrolyte. Also, the micellar dispersion can contain other additives such as corrosion inhibiting agent, bactericides, etc. Examples of the hydrocarbon, the aqueous medium, the surfactants, the cosurfactants, and the electrolytes are found in U.S. Pat. Nos. 3,254,714 and 3,275,075 to Gogarty et al., 3,497,006 to Jones et al. and 3,467,194 and 3,470,958 to Kinney.

The mobility of the micellar dispersion is desirably about equal to or greater than the mobility of the formation fluids (i.e., combination of oil and water within the formation).

The amount of micellar dispersion injected into the wellbore should be sufficient to displace substantially all the fluids in at least 3 to about 20 feet in radius outwardly from the wellbore. Generally, from about 0.1 – 10 barrels of dispersion per vertical foot of oil-bearing sand is sufficient and from about one – five barrels per foot is preferable.

The micellar dispersion is preferably injected at a pressure less than the formation fracture pressure. After the dispersion is injected into the formation, it can remain in contact with the area immediately adjacent the wellbore for times up to about 6 hours and more preferably for about 12 hours. Such contact times assure a more complete water solubilization, and therefore allow for better cleansing of the porous rock.

The hydrocarbon which contains the oil-wetting chemical injected after the micellar solution is preferably compatible with the crude oil being produced by the producing well. Preferably, it is crude oil and more preferably obtained from the existing production well. However, the hydrocarbon can be selected from hydrocarbons useful to make up the micellar dispersion and it can also be a synthetic hydrocarbon. Further, water can also be used to carry the oil-wetting chemical into the formation, but a non-aqueous solvent is preferred.

The micellar dispersion is preferably displaced by the hydrocarbon (containing the oil-wetting agent) to a distance of at least 20 feet radially outward from the wellbore. Preferably, about 0.1 to about 10 or more volumes, based on the volume of micellar dispersion injected, is injected into the formation. The effect of this displacement is to render the oil-bearing sands immediately adjacent the wellbore oil-wet and thus improve the relative permeability to the flow of crude oil. The oil-wetting agent(s) imparts a substantially permanent oleophilic character to the surrounding strata. The result of the invention is to impart a "lasting" improvement in the productivity index of the producing well, thus facilitating movement of the oil to the wellbore.

The oil-wetting agents used in conjunction with the hydrocarbon are preferably amines or substituted-ammonium compounds having molecular weights from about 150 to about 1,500 or more and are compatible with the reservoir rock and formation fluids, i.e., the amines will not react to "plug" the formation, etc. These amines and substituted ammonium compounds are either basic nitrogen compounds or salts or anhydrides of basic nitrogen compounds. Examples of preferred types of amines and substituted-ammonium compounds include: hexadecylamine; hexadecylamine hydrochloride; octadecylamine; octadecylamine acetate; diethylcetyl amine hydrosulfate; octadecyl trimethyl ammonium chloride; cetyl pyridinium bromide; 2-pentadecyl-4,5-dihydroimidazole; 2-heptadecyl-4, 5-dihydroimidazole acetate; 2-heptadecyl-3-aminoethyl-4, 5-dihydroimidazole acetate; cetyloxymethyl pyridinium hydrosulfate, stearloxymethly-N-ethyl piperidinium sulfate; decyl diethylamine; lauryl dimethylamine; cetyl dimethylphenyl ammonium chloride; benzylcetyldiethylammonium chloride; para-stearoylaminophenyl-trimethyl-ammoniumsulfomethylate; heptadecyldibenzyl-benzimidazolium chloride; docosylamine; 2-heptadecyl-3-diethylene-diamino-4, 5-dihydroimidazole diacetate. Further examples of amines useful with this invention include those found in U.S. Pat. No. 2,331,594.

While the oil-wetting agents utilized in this invention are preferably amines and/or substituted-ammonium compounds, any other oil-wetting agent which is compatible with the reservoir fluids and which will effectively oil-wet the reservoir rock is useful The hydrocarbon and oil-wetting agent solution should remain within the formation for a short time up to several hours. For low concentrations of chemicals the waiting time is preferably for about 6 to about 12 hours or more. Such contact time allows the amines to be adsorbed on the cleansed pores of the formation rock, thereby providing a lasting oleophilic character.

The actual amount of chemical required to oil-wet a particular reservoir can be determined from lab test using reservoir samples. However, a concentration range of the agent to make a rock preferentially oil-wet can be from about 100 ppm to about 5 percent. More concentrated solutions could be used especially if downtime is an important factor is an area.

One of the purposes of injecting the micellar dispersion is to displace formation water near the wellbore and replace the water with hydrocarbon containing the oil-wetting chemical, which results in alteration of the relative permeability to the flow of oil in the oil-bearing reservoir rock immediately adjacent the wellbore. The formation water is dispersed out into the reservoir and discouraged from re-entry to discount the adverse influence of water saturation on high relative permeability to the flow of oil. Desirably, the area immediately adjacent the wellbore is 100 percent saturated with oil after the invention is effected in the reservoir. The high molecular weight amine, with its oleophilic character, assures that this area immediately adjacent the wellbore remains saturated with oil throughout the producing life of the reservoir since the relative permeability to the flow of crude oil is favorable.

This invention is particularly applicable to oil wells wherein high water saturation near the wellbore decreases the relative permeability to oil and thus restricts oil productivity. Such a watered-out well can be changed to an oil-producing well by removing as much as possible the water saturation of the area adjacent the wellbore. When the well is returned to production, the near wellbore relative permeabilities and its oil-wet pore surfaces will encourage the flow of oil and discourage the flow of water.

It is intended that the invention not be limited by specific information contained herein. Rather, it is intended that all equivalents in the particular art be incorporated within the scope of the invention as defined in the specification and appended claims.

What is claimed is:

1. A process of increasing crude oil production from an oil-bearing subterranean reservoir having a producing well in fluid communication therewith, the process comprising:
    1. injecting into the reservoir a micellar dispersion,
    2. displacing the micellar dispersion radially out into the reservoir by injecting a hydrocarbon solution containing an oil-wetting agent(s), and thereafter
    3. permitting the producing well to return to production.

2. The process of claim 1 wherein the micellar dispersion is either an oil- or water-external type and is permitted to remain in contact with the reservoir for a period of time up to about 12 hours before the micellar dispersion is displaced radially outward by the hydrocarbon solution containing the oil-wetting agent(s).

3. The process of claim 1 wherein the hydrocarbon solution containing the oil-wetting agent(s) is permitted to remain in contact with the reservoir for a period of time up to about 12 hours before returning the well to production.

4. The process of claim 1 wherein the hydrocarbon is crude oil compatible with the reservoir.

5. The process of claim 1 wherein a sufficient volume of hydrocarbon solution containing the oil-wetting agent(s) is injected into the reservoir to substantially contact the reservoir rock to a distance of about three to about 20 feet.

6. The process of claim 1 wherein about 0.1 – 10 barrels of the micellar dispersion per vertical foot of oil-bearing reservoir rock is injected into the reservoir.

7. The process of claim 1 wherein about 0.1 – 10 barrels of the hydrocarbon solution containing oil-wetting agent(s) per vertical foot of oil-bearing reservoir rock is injected into the reservoir.

8. The process of claim 1 wherein water is used instead of hydrocarbon to carry the oil-wetting agent into the formation.

9. A process of increasing crude oil production from an oil-bearing subterranean reservoir having a producing well in fluid communication therewith, the process comprising:
    1. injecting into the reservoir a micellar dispersion,
    2. displacing the micellar dispersion radially out into the reservoir by injecting a hydrocarbon solution containing amine(s) and/or ammonium-substituted compound(s) having a molecular weight range of about 150 to about 1,500, and thereafter
    3. permitting the producing well to return to production.

10. The process of claim 9 wherein the micellar dispersion is permitted to remain in contact with the reservoir for a period of time up to about 12 hours before the micellar dispersion is displaced radially outward by the hydrocarbon solution containing the amine(s) and/or ammonium-substituted compound(s).

11. The process of claim 9 wherein the hydrocarbon solution containing the amine(s) and/or ammonium-substituted compound(s) is permitted to remain in contact with the reservoir for a period of time up to about 12 hours before returning the well to production.

12. The process of claim 9 wherein the hydrocarbon is crude oil compatible with the reservoir.

13. The process of claim 9 wherein the volume of hydrocarbon solution containing the amine(s) and/or ammonium-substituted compound(s) is injected into the reservoir for a distance of about 3 feet to about 20 feet.

14. The process of claim 9 wherein about 0.1 – 10 barrels of the micellar dispersion per vertical foot of oil-bearing sand is injected into the reservoir.

15. The process of claim 9 wherein about 0.1 – 10 barrels of the hydrocarbon solution containing amine(s) and/or ammonium-substituted compound(s) per vertical foot of oil-bearing sand is injected into the reservoir.

* * * * *